(12) United States Patent
Uno et al.

(10) Patent No.: US 7,859,975 B2
(45) Date of Patent: Dec. 28, 2010

(54) HOLOGRAM RECORDER AND HOLOGRAM RECORDING METHOD

(75) Inventors: Kazushi Uno, Kawasaki (JP); Hiroyasu Yoshikawa, Kawasaki (JP); Yasumasa Iwamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 440 days.

(21) Appl. No.: 12/058,158

(22) Filed: Mar. 28, 2008

(65) Prior Publication Data
US 2008/0239923 A1    Oct. 2, 2008

(30) Foreign Application Priority Data
Mar. 30, 2007    (JP)    .............................. 2007-092919

(51) Int. Cl.
*G11B 7/00*    (2006.01)
(52) U.S. Cl. .................................. 369/103; 369/112.19
(58) Field of Classification Search ........................ None
See application file for complete search history.

(56) References Cited

U.S. PATENT DOCUMENTS

| 2003/0002424 A1* | 1/2003 | Temple ........................ 369/103 |
| 2007/0121468 A1* | 5/2007 | Koyama et al. ............. 369/103 |

FOREIGN PATENT DOCUMENTS

| JP | A 2005-302203 | 10/2005 |
| JP | A 2006-39134 | 2/2006 |
| JP | A 2006-145676 | 6/2006 |

* cited by examiner

*Primary Examiner*—Christopher R Lamb
(74) *Attorney, Agent, or Firm*—Greer, Burns & Crain, Ltd

(57) ABSTRACT

A hologram recorder includes a light source for emitting a laser beam, a polarizing beam splitter for splitting the laser beam into a recording beam and a reference beam in accordance with a state of polarization, and a rotary polarizer located between the light source and the polarizing beam splitter. The rotary polarizer has the function of optical rotation, whereby a polarization component to be the recording beam is increased from the central portion toward the peripheral portion of the laser beam, and a polarization component to be the reference beam is decreased from the central portion toward the peripheral portion of the laser beam.

6 Claims, 9 Drawing Sheets

HOLOGRAM RECORDER AND HOLOGRAM RECORDING METHOD

BACKGROUND OF THE INVENTION

1. Field of the Invention

The present invention relates to a hologram recorder that records a hologram by causing interference between a recording beam and a reference beam on a hologram recording medium, and to a method of recording the hologram.

2. Description of the Related Art

A conventional hologram recorder is disclosed in JP-A-2006-145676, for example. This hologram recorder splits a laser beam emitted by a light source into a recording beam and a reference beam with a beam splitter, and modulates the recording beam with a spatial light modulator according to information to be recorded. Then the recording beam and the reference beam are caused to interfere with each other on a hologram recording medium, thereby recording holograms. Between the light source and the beam splitter, a beam shaper is provided for equalizing the intensity distribution of the laser beam. The hologram recorder with such beam shaper can shape the laser beam that presents a Gaussian intensity distribution pattern into a beam with an equalized intensity distribution, and also the recording beam emitted by the spatial light modulator into a beam with an equalized intensity distribution. Such hologram recorder can record a hologram composed of an interference fringe pattern having a uniform contrast, thereby minimizing reading errors when reconstructing the hologram.

In the conventional hologram recorder, however, the beam shaper includes a combination of special aspherical lenses, and such beam shaper has to be strictly accurately positioned in the recorder, which requires complicated designing and manufacturing process, as well as a high cost.

SUMMARY OF THE INVENTION

The present invention has been proposed in the foregoing circumstances. It is therefore an object of the present invention to provide a hologram recorder and a method of recording holograms, whereby the intensity distribution can be equalized with a simple and inexpensive optical system.

A first aspect of the present invention provides a hologram recorder comprising: a light source for emitting a laser beam; a polarizing beam splitter for splitting the laser beam into a recording beam and a reference beam in accordance with polarization; and a rotary polarizer located between the light source and the polarizing beam splitter for increasing a polarization component to be the recording beam toward a peripheral portion from a central portion of the laser beam and for decreasing a polarization component to be the reference beam toward the peripheral portion from the central portion of the laser beam.

Preferably, the rotary polarizer may subject the laser beam to optical rotation in a manner such that the ratio of the polarization component to be the recording beam and the ratio of the polarization component to be the reference beam become equal to predetermined values at and around the central portion of the laser beam, and further that the ratio of the polarization component to be the recording beam is gradually increased from the predetermined value from the central portion toward the peripheral portion of the laser beam, while the ratio of the polarization component to be the reference beam is gradually decreased from the predetermined value from the central portion toward the peripheral portion of the laser beam.

Preferably, the rotary polarizer may include a liquid crystal layer that allows passage of the laser beam, where the liquid crystal layer has a continuously varying thickness from a portion that transmits the central portion of the laser beam toward a portion that transmits the peripheral portion of the laser beam.

Preferably, the rotary polarizer may include a liquid crystal layer that allows passage of the laser beam, where the liquid crystal layer is subjected to progressively different voltages from a portion that transmits the central portion of the laser beam toward a portion that transmits the peripheral portion of the laser beam.

Preferably, the hologram recorder of the present invention may further comprise a spatial filter located between the rotary polarizer and the polarizing beam splitter.

A second aspect of the present invention provides a hologram recording method, which comprises the steps of: subjecting a laser beam emitted from a light source to polarization adjustment; splitting the laser beam subjected to polarization adjustment into a recording beam and a reference beam; modulating the recording beam according to information to be recorded; and recoding a hologram by causing the modulated recording beam and the reference beam to interfere with each other on a hologram recording medium. The step of subjecting the laser beam to polarization adjustment comprises both increasing a polarization component to be the recording beam and decreasing a polarization component to be the reference beam, where the increasing and the decreasing are performed in a direction from a central portion of the laser beam toward a peripheral portion of the laser beam.

Other features and advantages of the present invention will become more apparent through the following detailed description given with reference to the accompanying drawings.

DETAILED DESCRIPTION OF THE PREFERRED EMBODIMENTS

Embodiments of the present invention will be described below with reference to the drawings.

Figure 1:
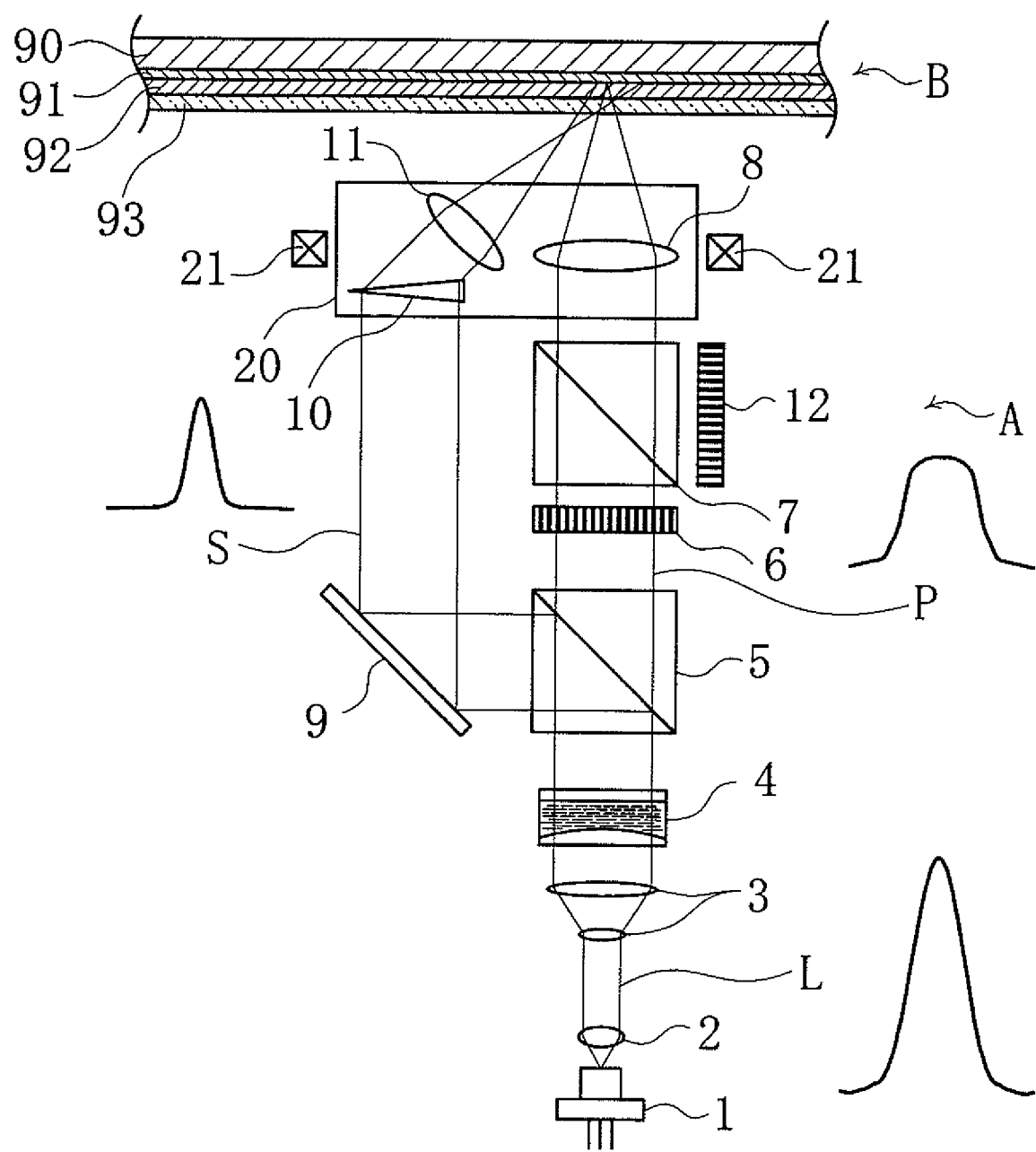
FIG. 1 is a schematic diagram showing an overall configuration of a hologram recorder according to a first embodiment of the present invention.
Figure 2:
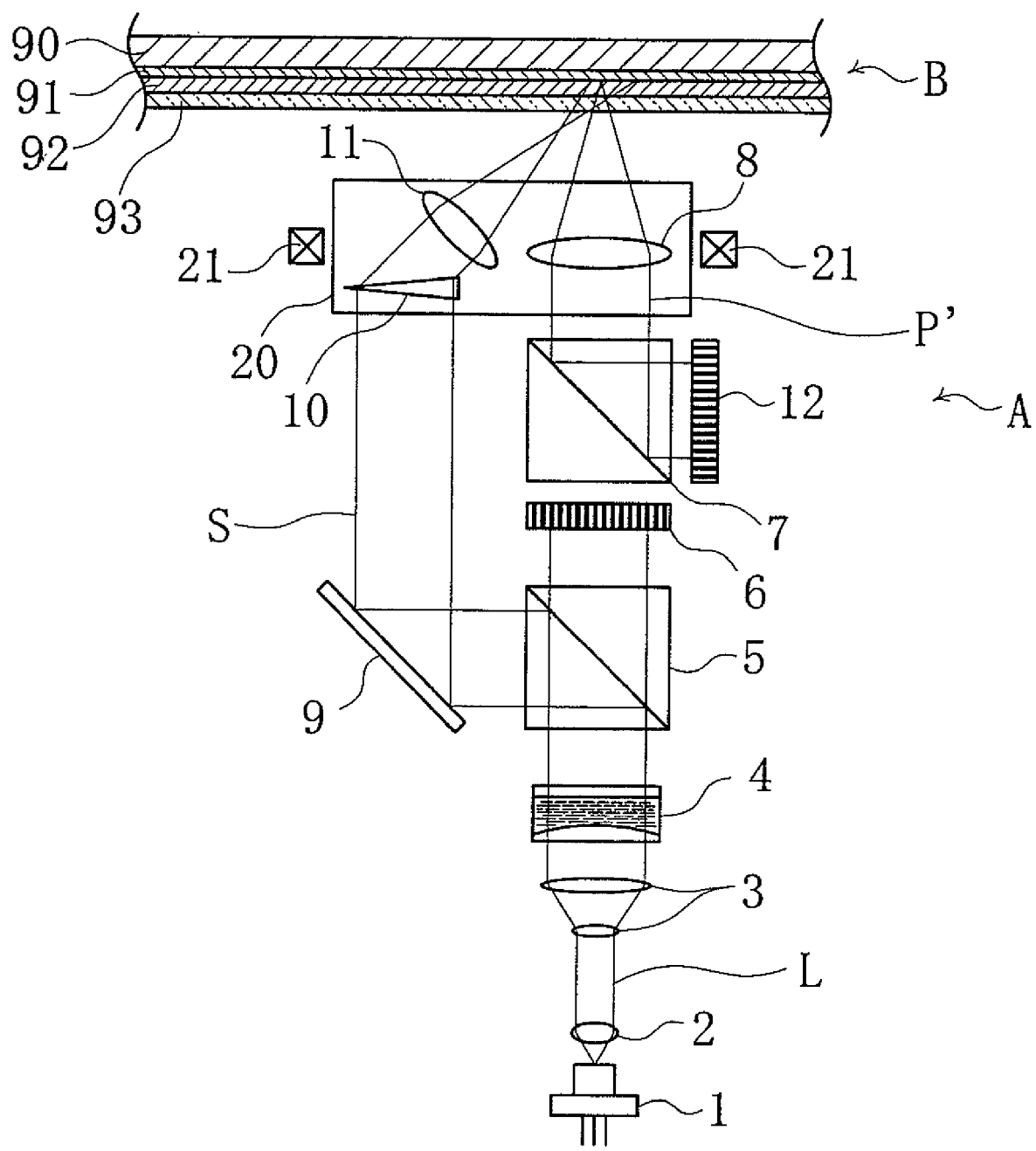
FIG. 2 is a schematic diagram showing an overall configuration of the hologram recorder shown in FIG. 1, under a reconstruction phase.

FIGS. 1 through 5 illustrate a hologram recorder according to a first embodiment of the present invention. Among these figures, FIG. 1 shows the hologram recording operation of the recorder, while FIG. 2 shows the hologram reconstructing operation of the recorder.

As shown in FIGS. 1 and 2, the hologram recorder A includes a light source 1, a collimator lens 2, a beam expander 3, a rotary polarizer 4, a polarizing beam splitter 5, a spatial light modulator 6, a half mirror 7, an objective lens 8 for both of the recording beam and reconstruction beam in common, a reflecting plate 9, a prism 10, an objective lens 11 for the reference beam, an imaging device 12, and a hologram recording medium B. The objective lens 8, 11 and the prism 10 are incorporated in a head unit 20, and the position of the head unit 20 is adjusted in a thickness direction of the hologram recording medium B, via a driving unit 21 such as an electromagnetic coil. The hologram recording medium B has a multilayer structure including a substrate 90, a reflecting layer 91, a recording layer 92, and a cover layer 93, and produces a reconstruction beam P' by reflection, in a reconstruction phase.

Figure 3:
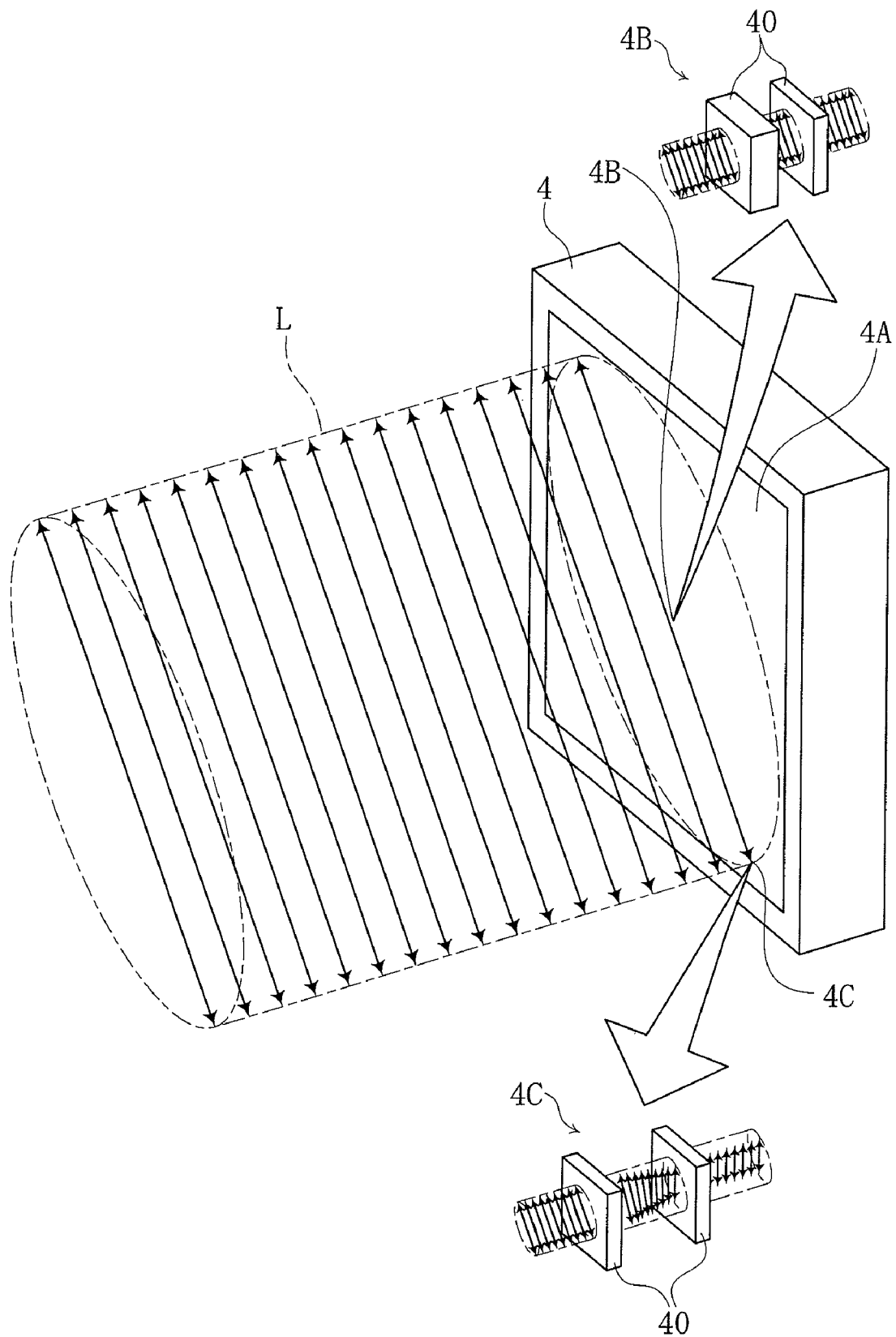
FIG. 3 is a perspective view showing a rotary polarizer shown in FIG. 1.

The light source 1 comprises, for example, a semiconductor laser device configured to emit a highly interferential laser beam L of a relatively narrow frequency band. The laser beam L is a linearly polarized beam that presents an intensity distribution of a Gaussian distribution pattern, and is incident upon the rotary polarizer 4 through the collimator lens 2 and the beam expander 3. The collimator lens 2 converts the laser beam L into a parallel light. The beam expander 3 expands the diameter of the laser beam L. As shown in FIG. 3, the polarization direction of the laser beam L (indicated by double-pointed arrows) is aligned in a predetermined direction, before being incident upon the rotary polarizer 4.

As shown in FIG. 3, the rotary polarizer 4 comprises, for example, a liquid crystal panel including a nematic liquid crystal layer (not shown) between two transparent substrates 40. The liquid crystal layer has, for example, the smallest thickness at a portion that transmits the central portion of the laser beam L, and a greater thickness at a portion that transmits a peripheral portion of the laser beam L. More specifically, the overall incident surface 4A of the liquid crystal layer is of a concavely curved shape, and the thickness of the liquid crystal layer is continuously greater toward the peripheral portion of the incident surface, from the central portion 4B thereof. However, the thickness of the rotary polarizer 4 as a whole is constant because the thickness of the transparent substrate 40 on the incident surface side is shaped in a contrary pattern to that of the liquid crystal layer. The transparent substrate 40 on the incident surface side is, for example, made of a molding resin material, and shaped with a curvature on an inner surface disposed in contact with the liquid crystal layer. In the central portion 4B of the incident surface of the rotary polarizer 4 thus configured, the optical rotation effect of the liquid crystal is so weak that the polarization direction of the laser beam L is barely changed. In contrast, for example in the vicinity of the peripheral portion 4C of incident surface, the liquid crystal exerts greater optical rotation, thereby changing the polarization direction of the laser beam L along the distortion of the liquid crystal molecules. In short, the rotary polarizer 4 has a greater power of optical rotation as proceeding from the central portion toward the peripheral portion of the laser beam L.

Figure 4:
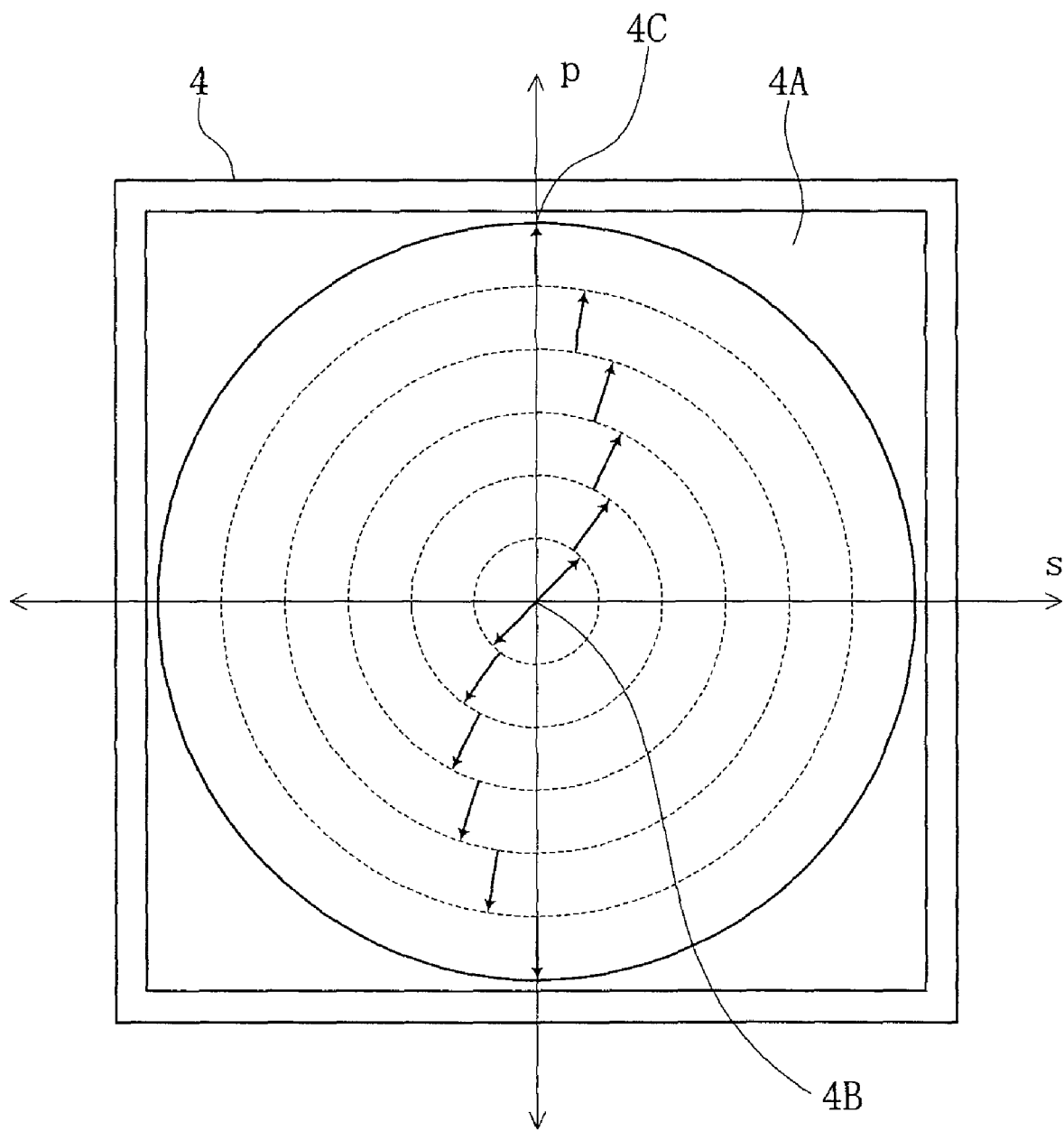
FIG. 4 is a plan view showing the rotary polarizer shown in FIG. 1.

FIG. 4 shows arrows representing the polarization directions of the laser beam L immediately after passing through the rotary polarizer 4. It is to be noted that though FIG. 4 is depicted as including discrete concentric zones each presenting a certain polarization direction, actually the polarization direction changes continuously in accordance with the varying thickness of the liquid crystal layer. For example, the polarization direction of the laser beam L that has been transmitted through the central portion 4B of the incident surface is oriented in the middle between the p-polarization and the s-polarization. The polarization direction of the laser beam L gradually approaches the p-polarization at a position closer to the peripheral portion 4C of the incident surface, farther away from the central portion 4B thereof, and at the edge of the laser beam L the polarization direction almost becomes the p-polarization. The laser beam L subjected to the rotary polarization is incident upon the polarizing beam splitter 5.

The polarizing beam splitter 5 splits the laser beam L incident thereon into a recording beam P directed to the spatial light modulator 6, and a reference beam S directed to the objective lens 11 through a different optical path. The polarizing beam splitter 5 transmits a beam linearly polarized in the p-polarization direction as the recording beam P, and a beam linearly polarized in the s-polarization direction as the reference beam S. The spatial light modulator 6 comprises, for example, a liquid crystal display device, and modulates the pixel of the recording beam P according to the information to be recorded. The half mirror 7 guides the recording beam P from the spatial light modulator 6 to the objective lens 8 in a recording phase, and guides the reconstruction beam P' returning from the hologram recording medium B through the objective lens 8 to the imaging device 12 in a reconstruction phase. The imaging device 12 is a photosensor of a CCD or CMOS type, and converts the reconstruction beam P' into a digital signal, to read out the information stored in a form of the hologram.

The objective lens 11 for the reference beam is oriented such that the optical axis thereof defines a predetermined angle with respect to the objective lens 8 for the recording beam/reconstruction beam in common. The reference beam S is guided from the polarizing beam splitter 5 to the objective lens 11 for the reference beam through the reflecting plate 9 and the prism 10. The reference beam S in the recording phase is emitted so as to overlap the recording beam P onto the recording layer 92 of the hologram recording medium B. This causes the recording beam P and the reference beam S to interfere with each other, thereby recording a hologram on the recording layer 92. The reference beam S in the reconstruction phase is emitted onto a predetermined section on the recording layer 92 where the hologram is recorded. Then a reconstruction beam P' according to the recorded hologram is created at the predetermined section on the recording layer 92, and such reconstruction beam P' is detected by the imaging device 12.

The function of the hologram recorder A will now be described below.

In the recording phase, as shown in FIG. 1, the laser beam L emitted by the light source 1 sequentially passes through the collimator lens 2, the beam expander 3, and the rotary polarizer 4, thus reaching the polarizing beam splitter 5. The polarizing beam splitter 5 directs the p-polarization component of the laser beam L toward the spatial light modulator 6 as the recording beam P, and the s-polarization component of the laser beam L toward the reflecting plate 9 as the reference beam S.

Figure 5:
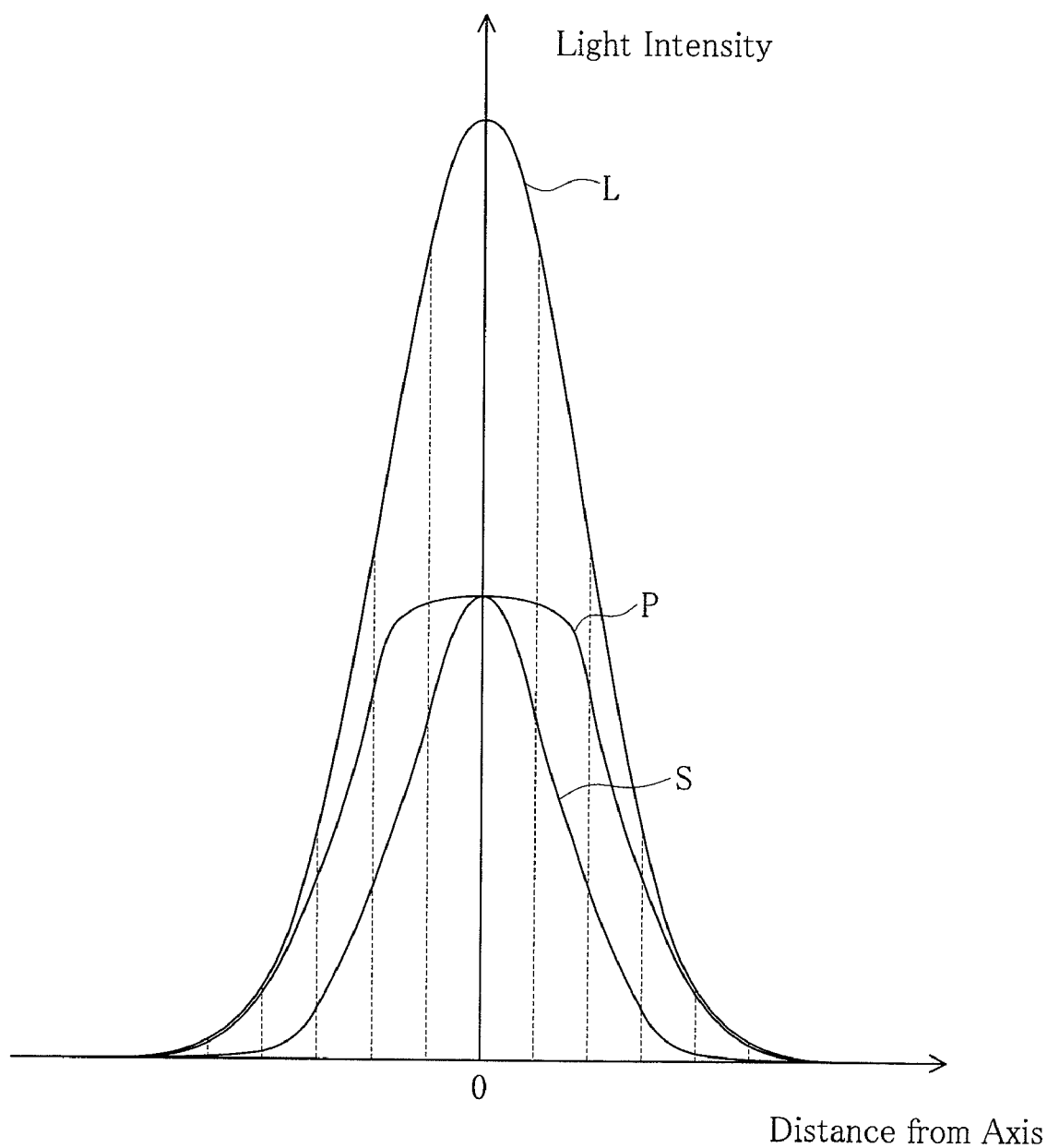
FIG. 5 is a diagram for explaining the optical effect of the rotary polarizer.

At this moment, the intensity distribution of the laser beam L immediately before reaching the rotary polarizer 4 presents, as shown in FIG. 5, a Gaussian distribution pattern in which the intensity steeply drops at a position farther from the optical axis, and the polarization direction of the laser beam L is, as shown in FIG. 3, in the middle between the p-polarization and the s-polarization. The central portion of such laser beam L is barely subjected to rotation by the rotary polarizer 4, when being transmitted through the central portion 4B of the incident surface of the rotary polarizer 4. In contrast, the peripheral portion of the laser beam L is affected relatively strongly by the optical rotation because of being transmitted through the peripheral portion 4C of the incident surface of the rotary polarizer 4, so that the laser beam L becomes polarized almost in the direction of the p-polarization.

Specifically, the ratio (%) between the p-polarization component and the s-polarization component of the laser beam L immediately after being transmitted through the rotary polarizer 4 presents continuous change from 50:50 to 100:0, as proceeding from the central portion toward the peripheral portion of the laser beam L. Upon dividing the intensity of the laser beam L into the intensity of the p-polarization component and that of the s-polarization component according to the ratio of p:s, the intensity distribution of the p-polarization component to constitute the recording beam P presents a hat-shaped distribution as shown in FIG. 5, with equalized intensity over a maximal range. In contrast, the intensity distribution of the s-polarization component to constitute the reference beam S is maintained generally in the Gaussian distribution pattern.

The recording beam P is modulated by the spatial light modulator 6 into a beam of a pixel pattern according to the information to be recorded, and the emitted onto the predetermined section on the hologram recording medium B, through the objective lens 8. The recording beam P has a intensity distribution equalized over a maximal range before reaching the spatial light modulator 6, and therefore, only such portion of the recording beam P in the distribution range where the light intensity is not less than a predetermined level is preferably made incident upon the spatial light modulator 6. Accordingly, the spatial light modulator 6 forms the pixel pattern of a generally uniform brightness.

Meanwhile, the reference beam S is emitted onto the predetermined section on the hologram recording medium B through the objective lens 11, thereby creating interference with the recording beam P on the recording layer 92 in the predetermined section. Through such route, the reference beam S is, because of its intensity distribution of the Gaussian distribution pattern, barely likely to suffer unevenly deformed intensity distribution despite diffraction experienced while propagating over a certain distance. Accordingly, a hologram composed of an interference fringe pattern of uniform brightness is recorded on the recording layer 92.

In the reconstruction phase, the laser beam L emitted by the light source 1 passes through the polarizing beam splitter 5 as in the recording phase, so that the p-polarization component is directed toward the spatial light modulator 6, while the s-polarization component is directed to the reflecting plate 9 as the reference beam S, as shown in FIG. 2. In this phase, however, the spatial light modulator 6 is turned off so as not to transmit the beam. Accordingly, only the reference beam S is emitted onto the hologram recording medium B. In the predetermined section of the hologram recording medium B, therefore, the reference beam S interferes with the hologram already recorded, thereby creating the reconstruction beam P', so that the reconstruction beam P' is detected by the imaging device 12 through the objective lens 8 and the half mirror 7. As a result, the information recorded in the form of the hologram is reproduced.

In the reconstruction phase also, the reference beam S propagates with the intensity distribution generally maintained in the Gaussian distribution pattern, and hence reaches the hologram recording medium B without suffering uneven deformation of the intensity distribution, despite the diffraction experienced on its way. Accordingly, the imaging device 12 can recognize the hologram with uniform brightness, thereby minimizing the likelihood of committing a reading error.

Thus, the hologram recorder A of the first embodiment enables equalizing the intensity distribution of the recording beam P, merely by combining the rotary polarizer 4 and the polarizing beam splitter 5 which are simple and inexpensive devices, and thereby recording a hologram of a uniform interference fringe pattern, so as to prevent a reading error.

FIGS. 6 to 9 depict hologram recorders according to other embodiments of the present invention. In these drawings, members or elements the same as or similar to those of the first embodiment are given the same numerals, and the description thereof will be omitted.

Figure 6:
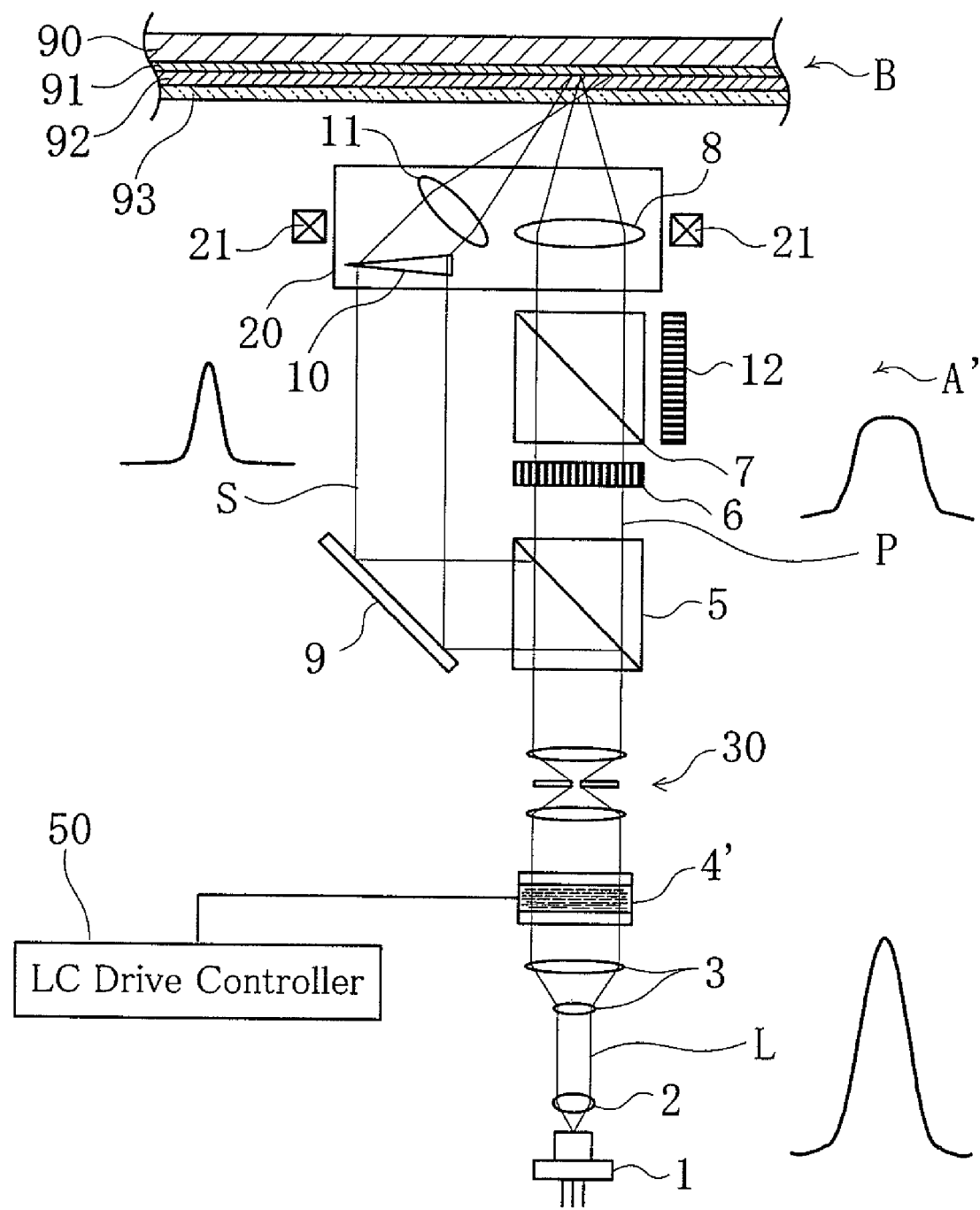
FIG. 6 is a schematic diagram showing an overall configuration of a hologram recorder according to a second embodiment of the present invention.
Figure 7:
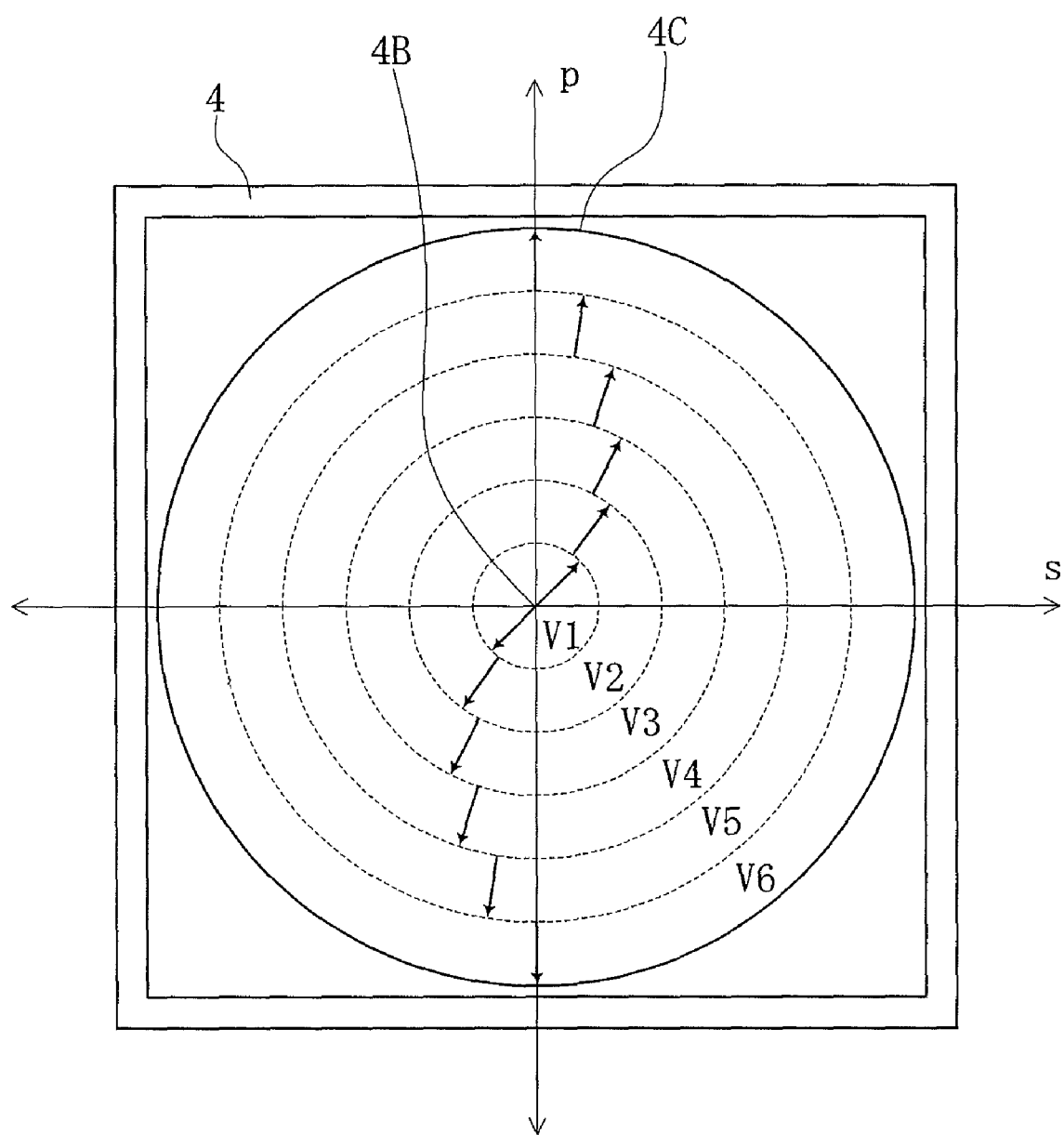
FIG. 7 is a plan view showing a working mode of a rotary polarizer shown in FIG. 6.

FIGS. 6 and 7 show a hologram recorder A' according to a second embodiment of the present invention, which includes a rotary polarizer 4' having a liquid crystal layer that can change the liquid crystal behavior by application of a voltage, the spatial filter 30 located between the rotary polarizer 4' and the polarizing beam splitter 5, and a liquid crystal drive control unit 50 that applies a voltage to the rotary polarizer 4' to control the polarizer.

The rotary polarizer 4' comprises a liquid crystal panel including a liquid crystal layer of a uniform thickness, and a predetermined electrode provided on an inner side of the liquid crystal panel. As shown in FIG. 7, the incident surface of the rotary polarizer 4' is divided into concentric zones, to each of which a different voltage V1 to V6 is to be applied by the liquid crystal drive control unit 50. To the central zone, for example, a relatively high driving voltage V1 is applied, while the driving voltage becomes lower toward a zone closer to the periphery, until the driving voltage V6 becomes substantially zero in the outermost zone. With such rotary polarizer 4', molecules of the nematic liquid crystal barely incur distortion in the central portion 4B of the incident surface and hence the rotating effect is so weak that the polarization direction of the laser beam L is scarcely changed. In contrast, molecules of the nematic liquid crystal are distorted in the vicinity of the peripheral portion 4C of the incident surface, and hence the liquid crystal is subjected to a strong rotating effect, so that the polarization direction of the laser beam L is changed according to the distortion of the liquid crystal molecules. Thus, the rotary polarizer 4' is designed to rotate the polarization direction of the laser beam L by a larger angle toward the peripheral portion of the laser beam L, from the central portion thereof.

The polarization direction of the laser beam L immediately after being transmitted through the rotary polarizer 4' gradually becomes closer to the p-polarization from the central portion 4B toward the peripheral portion 4C of the incident surface, as shown in FIG. 7. The rotary polarizer 4' according to this embodiment is different in this aspect from the rotary polarizer 4 of the first embodiment. The laser beam L transmitted through the rotary polarizer 4' then passes through the spatial filter 30 to reach the polarizing beam splitter 5. Because of the effect of the spatial filter 30 acting on the laser beam L, the polarization directions regularly defined in the respective zones are disarranged, and the boundaries of the respective zones become vague so that the changes of the polarization direction turn continuous to a certain extent, rather than stepped changes. As a result, the laser beam L is incident upon the polarizing beam splitter 5 in a similar state to that according to the foregoing embodiment.

Thus, the hologram recorder A' of the second embodiment also enables equalizing the intensity distribution of the recording beam P, merely by controlling the rotary polarizer 4' which is a simple and inexpensive device, in the respective zones, and thereby recording a hologram of a uniform interference fringe pattern, so as to prevent a reading error.

Figure 8:
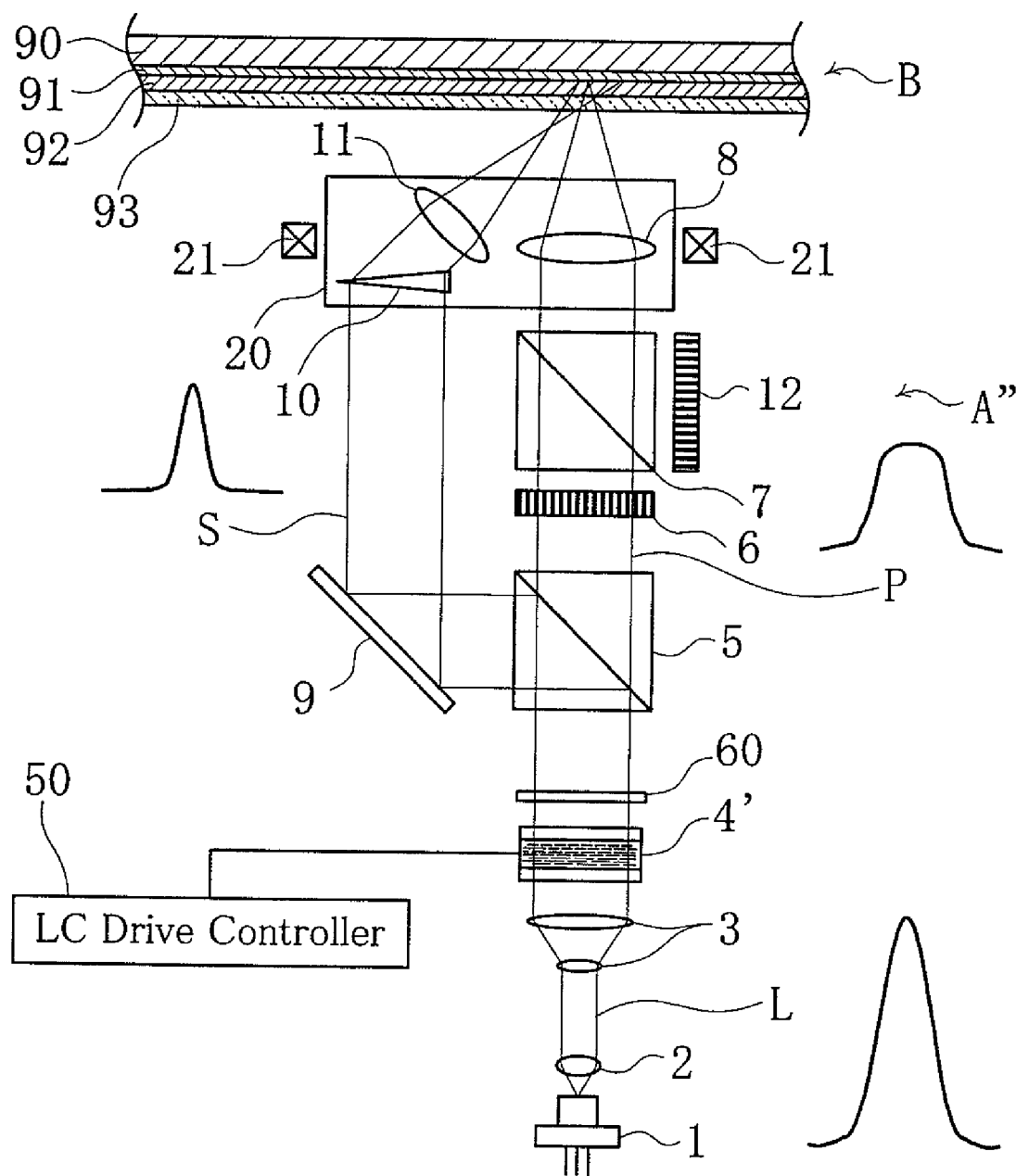
FIG. 8 is a schematic diagram showing an overall configuration of a hologram recorder according to a third embodiment of the present invention.
Figure 9:
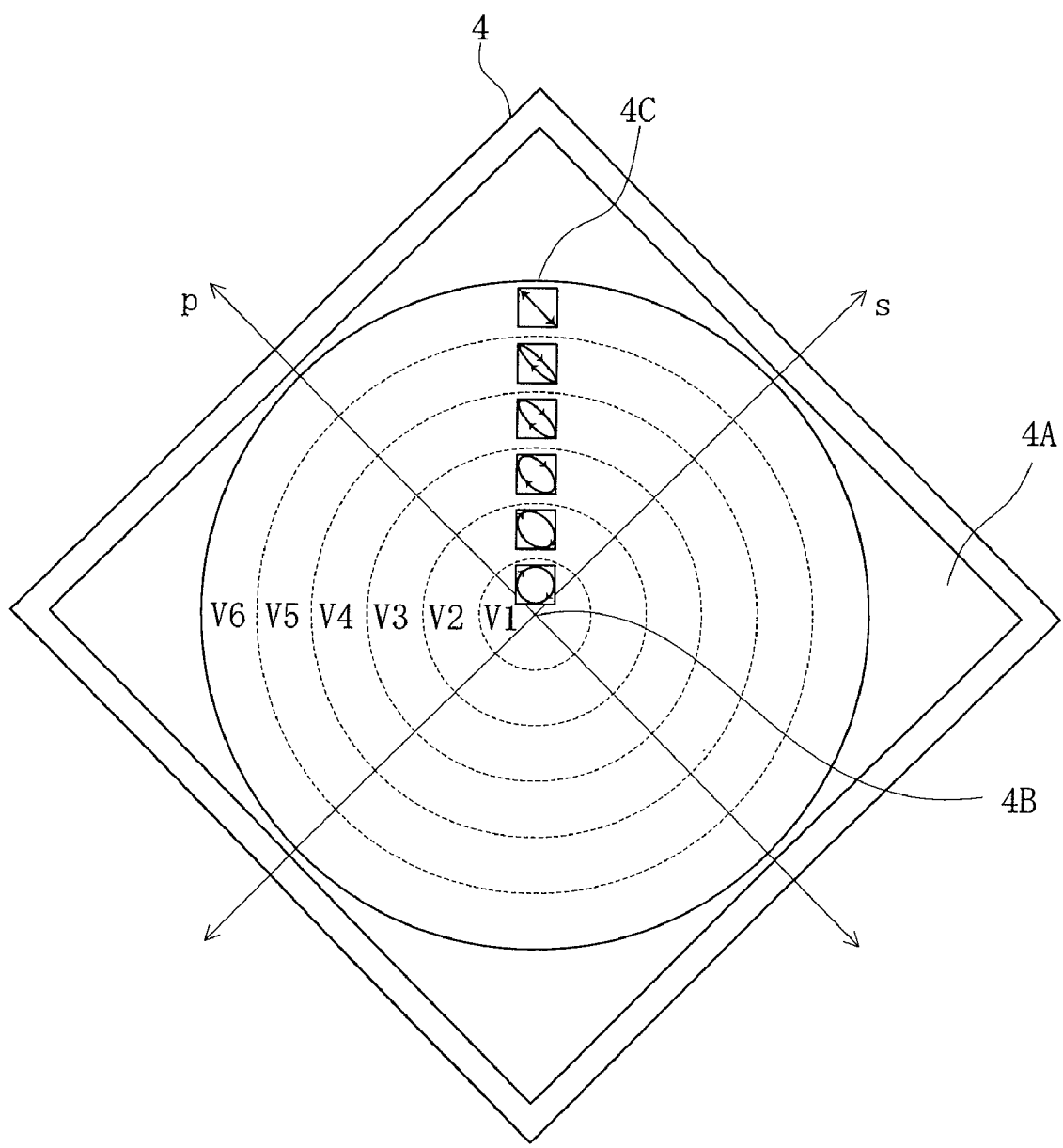
FIG. 9 is a plan view showing a working mode of a rotary polarizer shown in FIG. 8.

FIGS. 8 and 9 show a hologram recorder A" according to to a third embodiment of the present invention, which includes the rotary polarizer 4' similar to that according to the foregoing embodiment, as well as a λ/2 plate 60 located between the rotary polarizer 4' and the polarizing beam splitter 5.

The rotary polarizer 4' includes the liquid crystal panel, to which different voltages V1 to V6 are respectively applied to the concentric zones as in the foregoing embodiment, but is different from that of the foregoing embodiments in the following aspects.

The rotary polarizer 4' is mounted such that the rubbing direction for aligning the orientation of the liquid crystal molecules defines 45 degrees with respect to the polarization direction of the laser beam L immediately before reaching the rotary polarizer 4'. The liquid crystal layer of such rotary polarizer 4' exerts a liquid crystal effect such that the laser beam L is given a different phase difference according to the level of the applied voltage. For example, upon applying a relatively high driving voltage V1 to the zone close to the central portion 4B of the incident surface as shown in FIG. 9, a phase difference of $\pi/2$ is given to the laser beam L being transmitted through the zone, so that the laser beam L generally presents a circular polarization, and becomes incident upon the $\lambda/2$ plate 60. The laser beam L of such circular polarization includes approximately 50% each of the p-polarization component and the s-polarization component.

Meanwhile, the driving voltage is set to be gradually lower toward the peripheral portion 4C of the incident surface from the central portion 4B thereof. For example, the driving voltage V6 applied to the zone in the peripheral portion 4C is substantially zero. Accordingly, the laser beam L passing through such zone is transmitted as it is with the linear polarization, without being given a phase difference in the liquid crystal layer, and besides upon passing through the $\lambda/2$ plate 60, the laser beam L now only carries the p-polarization component. In other words, in the laser beam L that has been transmitted through the peripheral portion 4C, the ratio of the p-polarization component and the s-polarization component becomes generally 100:0.

As described above, the phase difference of 0 to $\pi/2$ is given to the laser beam L from the central portion 4B of the incident surface toward the peripheral portion 4C thereof, according to the level of the driving voltage. Accordingly, the laser beam L incurs a change in polarization characteristic from the circular polarization to the linear polarization, along the direction toward the peripheral portion 4C of the incident surface from the central portion 4B thereof. Thus, the rotary polarizer 4' is designed to form the phase difference distribution.

The polarization state of the laser beam L immediately after being transmitted through the rotary polarizer 4' and the $\lambda/2$ plate 60 transits, as shown in FIG. 9, from the circular polarization to the linear polarization along the direction toward the peripheral portion 4C of the incident surface from the central portion 4B thereof, so that the p-polarization component gradually becomes greater. The rotary polarizer 4' according to this embodiment is different from that according to the foregoing embodiment, in such aspect. In this case also, the laser beam L is incident upon the polarizing beam splitter 5 in a state similar to that of the foregoing embodiment.

Thus, the hologram recorder A" according to this embodiment also enables equalizing the intensity distribution of the recording beam P, merely by controlling the rotary polarizer 4' which is a simple and inexpensive device, in the respective zones, and thereby recording a hologram of a uniform interference fringe pattern, so as to prevent a reading error.

It is to be understood that the present invention is not limited to the foregoing embodiments.

For example, the method of changing the polarization direction or polarization state utilizing the rotary polarizer may be appropriately modified or designed, according to the polarization direction of the laser beam L with respect to the rotary polarizer or the way of use of the polarizing beam splitter to split the p-polarization and the s-polarization, as long as the method allows equalizing the intensity distribution of the recording beam.

The invention claimed is:

1. A hologram recorder comprising:
   a light source for emitting a laser beam;
   a polarizing beam splitter for splitting the laser beam into a recording beam and a reference beam in accordance with a state of polarization; and
   a rotary polarizer located between the light source and the polarizing beam splitter for increasing a polarization component to be the recording beam toward a peripheral portion from a central portion of the laser beam and for decreasing a polarization component to be the reference beam toward the peripheral portion from the central portion of the laser beam.

2. The hologram recorder according to claim 1, wherein the rotary polarizer subjects the laser beam to optical rotation in a manner such that a ratio of the polarization component to be the recording beam and a ratio of the polarization component to be the reference beam are equal to predetermined values in a vicinity of the central portion of the laser beam, and that the ratio of the polarization component to be the recording beam is gradually increased from the predetermined value from the central portion toward the peripheral portion of the laser beam, while the ratio of the polarization component to be the reference beam is gradually decreased from the predetermined value from the central portion toward the peripheral portion of the laser beam.

3. The hologram recorder according to claim 1, wherein the rotary polarizer includes a liquid crystal layer that allows passage of the laser beam, the liquid crystal layer having a continuously varying thickness from a portion that transmits the central portion of the laser beam toward a portion that transmits the peripheral portion of the laser beam.

4. The hologram recorder according to claim 1, wherein the rotary polarizer includes a liquid crystal layer that allows passage of the laser beam, the liquid crystal layer being subjected to progressively different voltages from a portion that transmits the central portion of the laser beam toward a portion that transmits the peripheral portion of the laser beam.

5. The hologram recorder according to claim 4, further comprising a spatial filter located between the rotary polarizer and the polarizing beam splitter.

6. A hologram recording method comprising the steps of:
   subjecting a laser beam emitted from a light source to polarization adjustment;
   splitting the laser beam subjected to polarization adjustment into a recording beam and a reference beam;
   modulating the recording beam according to information to be recorded; and
   recoding a hologram by causing the modulated recording beam and the reference beam to interfere with each other on a hologram recording medium;
   wherein the step of subjecting the laser beam to polarization adjustment comprises both increasing a polarization component to be the recording beam and decreasing a polarization component to be the reference beam, the increasing and the decreasing being performed in a direction from a central portion of the laser beam toward a peripheral portion of the laser beam.

* * * * *